United States Patent [19]
Yoshida et al.

[11] Patent Number: 5,095,175
[45] Date of Patent: Mar. 10, 1992

[54] WATER-TIGHT RUBBER OR PLASTIC INSULATED CABLE

[75] Inventors: Fumio Yoshida; Katsuyuki Isaka; Susumu Koishihara; Tsutomu Tanji, all of Ibaraki, Japan

[73] Assignee: Hitachi Cable, Ltd., Tokyo, Japan

[21] Appl. No.: 690,853

[22] Filed: Apr. 24, 1991

[30] Foreign Application Priority Data

Apr. 24, 1990 [JP] Japan .................. 2-107874

[51] Int. Cl.$^5$ .............................. H01B 7/28
[52] U.S. Cl. .................. 174/23 R; 174/23 C; 174/120 SC; 174/128.1
[58] Field of Search ............ 174/23 R, 23 C, 120 SC, 174/126.1, 128.1

[56] References Cited

U.S. PATENT DOCUMENTS

| | | | |
|---|---|---|---|
| 3,684,821 | 8/1972 | Miyauchi et al. | 174/120 SC |
| 4,004,077 | 1/1977 | Woytiuk | 174/23 C |
| 4,125,741 | 11/1978 | Wahl et al. | 174/120 SC |
| 4,435,613 | 3/1984 | Gaubert | 174/23 C X |
| 4,791,240 | 12/1988 | Marin et al. | 174/23 C X |
| 4,961,961 | 10/1990 | Vincent et al. | 174/23 C X |

FOREIGN PATENT DOCUMENTS

| | | | |
|---|---|---|---|
| 7410 | 1/1989 | Japan | 174/23 C |
| 1484850 | 9/1977 | United Kingdom | 174/23 C |

Primary Examiner—Morris H. Nimmo
Attorney, Agent, or Firm—Heltagott & Karas

[57] ABSTRACT

A water-tight rubber or plastic insulated cable includes water-tight compound which is injected into apertures among stranded wires for a conductor. The stranded conductor is compressed to have a solidity factor of 85 to 95% of the conductor. The water-tight compound is injected into the apertures among the stranded wires except for an outermost surface of the conductor. The water-tight compound has a scorch time of more than 20 minutes under a temperature of 130° C. and includes conductive carbon of 50 to 60 weight %.

3 Claims, 2 Drawing Sheets

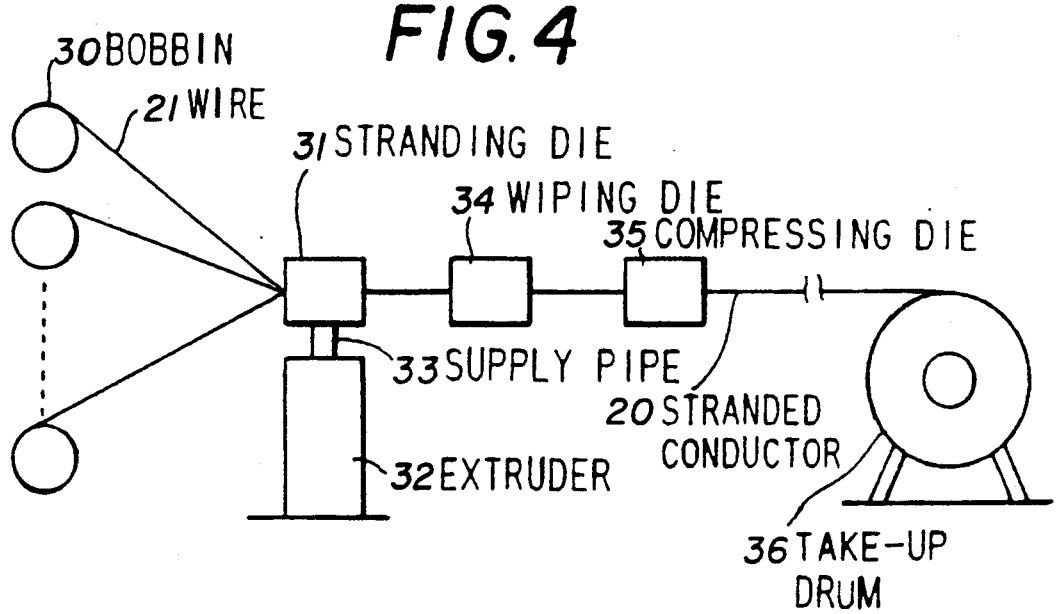
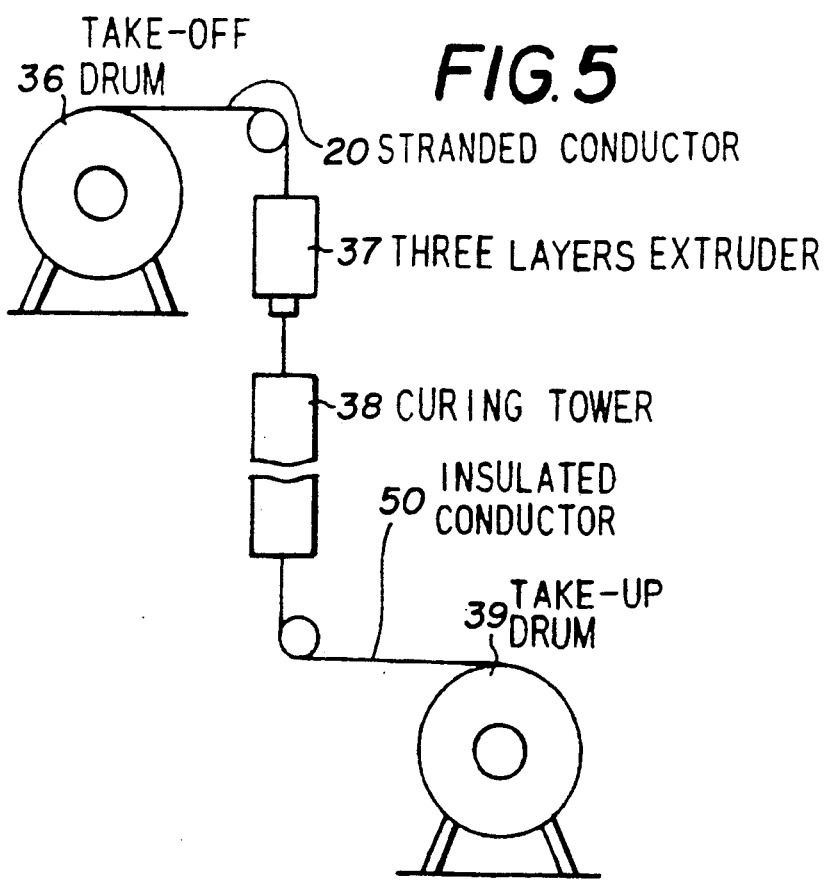

WATER-TIGHT RUBBER OR PLASTIC INSULATED CABLE

FIELD OF THE INVENTION

The present invention relates to a water-tight rubber or plastic insulated cable, and more particularly to, a water-tight rubber or plastic insulated cable having an improved water-tight compound.

BACKGROUND OF THE INVENTION

When a rubber or plastic insulated cable having a stranded conductor is submerged, water tends to propagate from an end, a joint portion, or a damaged sheath thereof into a longitudinal direction thereof, and consequently, the cable gets badly deteriorated. To overcome this problem, a water-tight rubber or plastic insulated cable has been proposed. This cable comprises a conductor of stranded wires, a water-tight compound, and a rubber or plastic insulation layer. The apertures among these stranded wires are filled with the water-tight compound, and the stranded wires are covered with the rubber or plastic insulation layer. In the manufacture of the cable, when the wires are stranded with each other, the water-tight compound is continuously extruded into the apertures by means of an extruder. Then, the water-tight compound is cured, and, thereafter, the conductor and the water-tight compound are covered by the rubber or plastic insulation layer. Here, inner and outer semi-conductive layers, a sheath, etc. are not explained.

In this water-tight rubber or plastic insulated cable, there are some relations between the viscosity of the water-tight compound and the water-tight characteristic of the completed cable. That is, the lower the viscosity of the water-tight compound is, the easier it is for the water-tight compound to be continuously extruded into the apertures. On the other hand, the water-tight compound of the completed cable must be properly stiff in its viscosity to provide the water-tightness thereof. Moreover, the water-tight compound must be stiff at a pre-heating stage just before the rubber or plastic layer extrusion process, in case of the conductor has the water-tight compound over the conductor surface, as shown in FIG. 1.

Taking the above relations into consideration, the water-tight rubber or plastic insulated cable disclosed in Japanese Patent Publication No. 63-25447 has been proposed by this applicant. According to this publication, the water-tight compound has a Mooney viscosity of 15 to 25 under a temperature of 130° C. In addition, the stranded conductor is compressed to have a solidity factor of 85 to 95%. The water-tight compound is injected into the apertures except for the outermost surface of the stranded conductor. From the introduction of the compressed conductor and the definition of the viscosity of the compound, the continuous extruding operation thereof becomes easier and the water-tight characteristic thereof becomes more improved than the conventional cable.

However, even the above improved water-tight rubber or plastic insulated cable has disadvantages in that continuous operation of extruding water-tight compound into apertures of the stranded conductor is limited to two or three days, since the flow of the water-tight compound becomes deteriorated in those days due to the curing of the water-tight compound in the extruder, and that the water-tight characteristic is not obtained as expected only by the definition of ,oney viscosity.

SUMMARY OF THE INVENTION

Accordingly, one object of the present invention is to provide a novel and useful water-tight rubber or plastic insulated cable in which the water-tight compound can be continuously extruded for longer days.

Another object of the present invention is to provide a novel and useful water-tight rubber or plastic insulated cable which has an predetermined water-tight characteristic.

According to one feature of the present invention, a water-tight rubber or plastic insulated cable, comprises: a conductor consisting of a stranded wires, the conductor being compressed to have an solidity factor of 85 to 95%; a water-tight compound, injected into apertures among the stranded wires, which has a scorch time of more than 20 minutes under a temperature of 130° C.; an inner semi-conductive layer which is extruded on the conductor; a rubber or plastic insulation layer which is extruded on the inner semiconductive layer, and an outer semi-conductive layer which is extruded on the rubber or plastic insulation layer; wherein the water-tight compound is not provided between the conductor and the inner semi-conductive layer.

According to a further feature of the present invention, a water-tight rubber or plastic insulated cable, comprises: a conductor consisting of a stranded wires, the conductor being compressed to have a solidity factor of 85 to 95%, a water-tight compound, injected into apertures among the stranded wires, which comprises conductive carbon of 50 to 60 weight %, an inner semi-conductive layer which is extruded on the conductor, the watertight compound being not provided between the conductor and inner-semiconductive layer, a rubber or plastic insulation layer which is extruded on the inner semiconductive layer, and an outer semi-conductive layer which is extruded on the rubber or plastic insulation layer.

According to a still further feature of the present invention, a water-tight rubber or plastic insulated cable, comprises: a conductor consisting of stranded wires, the conductor being compressed to have a solidity factor of 85 to 95%, a water-tight compound, injected into apertures among the stranded wires, which has a scorch time of more than 20 minutes under a temperature of 130° C. and comprises conductive carbon of 50 to 60 weight %, an inner semi-conductive layer which is extruded on the conductor, the water-tight compound being not provided between the conductor and the inner-semiconductive layer, a rubber or plastic insulation layer which is extruded on the inner semiconductive layer, and an outer semi-conductive layer which is extruded on the rubber or plastic insulation layer.

BRIEF DESCRIPTION OF THE DRAWINGS

The present invention will be explained in more detail in accordance with the following drawings, wherein;

FIGS. 4A and 4B show explanatory diagrams for explaining the manufacture of the water-tight rubber or plastic insulated cable in FIG. 3

DESCRIPTION OF THE PREFERRED EMBODIMENTS

A detailed description will now be given of a conventional water-tight rubber or plastic insulated cable with reference to FIG. 1, before explaining a water-tight rubber or plastic insulated cable according to the present invention. This cable comprises a conductor 1 of stranded wires 2, water-tight compound 3, and a rubber or plastic insulation layer 4. The apertures among the stranded wires 2 are filled with the water-tight compound 3, and the wires 2 thus filled with the water-tight compound 3 are covered with the rubber or plastic insulation layer 4. Thanks to this construction, water can be prevented from propagating in the cable longitudinally.

In manufacturing this water-tight rubber or plastic insulated cable, when the wires 2 are stranded together to provide the conductor 1, the water-tight compound 3 is continuously extruded into the apertures thereamong by means of an extruder. Then, the extruded water-tight compound 3 is cured, and, thereafter, the conductor supplied with the water-tight compound 3 are covered by the rubber or plastic insulation layer 4. In the manufacture o this water-tight rubber or plastic insulated cable, it is generally observed that the lower the viscosity of the water-tight compound is, the easier it is for the water-tight compound to be extruded into the apertures of the stranded conductor.

Figure 1:
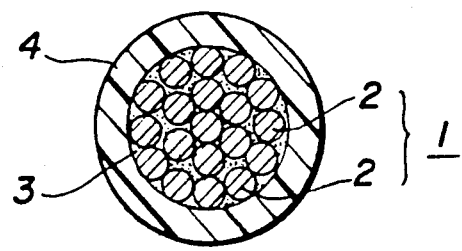
FIGS. 1 and 2 respectively show cross-sectional views of conventional water-tight rubber or plastic cables.

However, the water-tight rubber or plastic insulated cable as shown in FIG. 1 does not meet the requirements 1 and 2 set forth below.
1. The water-tight compound must be properly stiff to maintain the water-tightness of the conductor.
2. The water-tight compound must be stiff at a preheating stage just before the rubber or plastic layer extrusion process.

Figure 2:
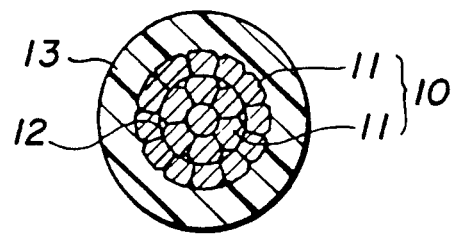

To overcome the above disadvantages, the water-tight rubber or plastic insulated cable as shown in FIG. 2 has been proposed and disclosed in Japanese patent Publication No. 63-25447 by this applicant. This water-tight rubber or plastic cable comprises a conductor 10 of stranded wires 11, water-tight compound 12, and a rubber or plastic insulation layer 13. The stranded conductor 10 is compressed to have a solidity factor of 85 to 95% of the conductor 10. In this water-tight cable, the water-tight compound is of a Mooney viscosity 15 to 25 under a temperature of 130° C. which is injected into the apertures among the wires 11 except for the outermost surface of the stranded conductor 10. Since the stranded conductor 10 is compressed, the outermost surface thereof becomes smooth, an area of concave portions between the adjacent wires to be filled with the water-tight compound is decreased, so that the water-tight compound over the conductor surface can be omitted. If the stranded conductor is so compressed that the solidity factor is more than 95%, the cable loses flexibility. On the other hand, if the stranded conductor is so compressed that the solidity factor is less than 85%, the outermost surface thereof cannot become smooth to a predetermined extent. In addition, since the water-tight compound has a Mooney viscosity of 15 to 25 under a temperature of 130° C., the continuous extruding operation can be easily achieved and a predetermined water-tight characteristic can be obtained. Hereupon, the terms "the predetermined water-tight characteristic" means that, if water having a hydraulic pressure of 5 kg/cm$^3$ is applied into one end of the cable having a length of 5 m, more than 24 hours takes the water to exit from the other end thereof. Moreover, the judgement as to whether or not the continuous extruding operation is realized without difficulty is made by checking the following points:

1. When the water-tight compound is rolled or mixed by a roller or a mixer, the water-tight compound does not stick to the roller or the mixer to avoid the deterioration of rolling or mixing operation.
2. The water-tight compound does not stick to a hopper of the extruder, so that it can be injected into the apertures among the wires with a constant amount.
3. When the water-tight compound is injected into the apertures among the wires, it does not stick to a feeding pipe located between the extruder and a stranding die, so that it is smoothly injected.
4. The water-tight compound is not too stiff to be smoothly injected into the apertures among the wires and the injection speed is constant. The water-tight rubber or plastic insulated cable which has been proposed by the applicant is not sufficiently satisfactory for the above points.

Figure 3:
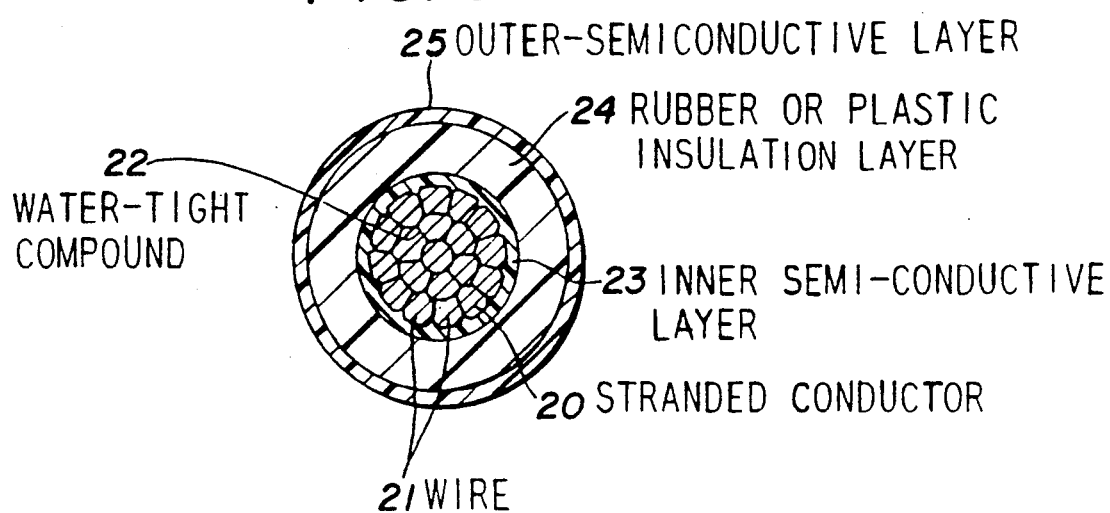
FIG. 3 shows a cross-sectional view of a water-tight rubber or plastic cable in a preferred embodiment according to the present invention.

Next, a detailed description will now be given of a water-tight rubber or plastic insulated cable according to the present invention with reference to FIG. 3. As shown in FIG. 3, this cable comprises a conductor 20 of stranded wires 21 having an arrangement of "1+6+12", water-tight compound 22, an inner semiconductive layer 23, a rubber or plastic insulation layer 24, and an outer semiconductive layer 25. In case of a cross-sectional area of 150 mm$^2$, each wire 21 has a diameter of 3.3 mm. The stranded conductor 20 is compressed so that it has a solidity factor of 85 to 95% of the conductor 20. As a result, the compressed conductor 20 has a diameter of 15.0 mm. The apertures among the wires 21 except for the outermost surface of the stranded conductor 20 are filled with the water-tight compound 22. The inner semi-conductive layer 23 having a thickness of 1.2 mm is extruded on the outermost surface of the stranded conductor 20. The rubber or plastic insulation layer 24 having a thickness of 8.4 mm is extruded on the stranded conductor 20. The outer semi-conductive layer 25 having a thickness of 0.6 mm is extruded on the rubber or plastic insulation layer 24.

The manufacture of the water-tight rubber or plastic insulated cable as shown in FIG. 3 is carried as shown in FIGS. 4 and 5. First, as shown in FIG. 4, the wires 21 supplied from a plurality of bobbins 30 are stranded together by a stranding die 31, and the water-tight compound 22 is simultaneously supplied to the stranding die 31 via a supply pipe 33 by an extruder 32, so that the compound 22 is injected into the apertures among the wires 21. The water-tight compound 22 thus injected is wiped not to be provided on the outermost surface of the stranded conductor 20 by means of a wiping die 34. Then, the stranded conductor 20 is compressed to have the above solidity factor by a compressing die 35, and wound on a take-up drum 36. Thereafter, as shown in FIG. 5, the stranded conductor 20 wound on the take-up drum 36 is transferred to an extrusion stage, at which it is covered by the inner semi-conductive layer 23, the rubber or plastic insulation layer 24, and the outer semi-conductive layer 25 by means of a three layer extruder 37. Lastly, the extruded layers are cured to provide an insulated conductor by a curing tower 38 and wound on a take-up drum 39. Among rubber or plastic insulated layers presently available, polyethylene which is cured to be cross-linked polyethylene is most popular. As a matter of course, the inner and outer semiconductive layers 23 and 25 may not be provided dependent on the use or applicable voltage in the present invention.

The water-tight compound 12 comprises conductive carbon of 60 weight % relative to butylrubber of 100 weight %, paraffin wax of 17 weight %, and has a volume resistivity of $2 \times 10^3$ Ω-cm and a scorch time of 30 minutes under a temperature of 130° C.

When water with a hydraulic pressure of 5 kg/cm$^3$ is applied from one end of the cable having a sample length of 5 m, the water does not exit from the other end of the cable, even if 24 hours have passed since the application. This demonstrates a predetermined water-tight characteristic. In addition, when water with a hydraulic pressure 1.5 kg/cm$^3$ is applied from one end of the cable having a sample length of 0.5 m, the water does not exit from the other end of the cable, even if 24 hours have passed since the application. Moreover, the above water-tight compound can, surprisingly, provide 10 day-continuous extruding operation in comparison with the conventional water-tight compound providing only a 3 day operation.

Here, the Table in which sampled cables 1 to 8 are examined is shown.

do not provide the satisfactory results as indicated by the symbol "X".

The third requirement of "24 hour/0.5 m at a hydraulic pressure of 0.5 kg/cm$^2$" is defined as, "when water of 0.5 kg/cm$^2$ is applied to one end of a cable having a length of 0.5 m, no leak of water occurs at the other end of the cable, when 24 hours has elapsed from the time of the water application" as described before. "24 hour/5 m at a hydraulic pressure of 5 kg/cm$^2$ has the same definition.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A water-tight rubber or plastic insulated cable, comprising:
   a conductor consisting of stranded wires, said conductor being compressed to have a solidity factor of 85 to 95% of said conductor;
   water-tight compound, injected into apertures among said stranded wires and not provided on an outermost surface of said conductor, which has a scorch time of more than 20 minutes under a temperature of 130° C.;

TABLE

| CABLE NO. | SCORCH TIME (MINUTES) | CARBON CONTENT (WEIGHT %) | VOLUME RESISTIVITY (Ω-cm) | CONTINUOUS EXTRUDING OPERATION (DAYS) | RESULT OF WATER-TIGHTNESS TEST | EVALUATION |
|---|---|---|---|---|---|---|
| 1 | 15 | 15 | $1 \times 10^6$ | 2 to 3 | 1.5 kg/cm$^2$ — 24 hr/0.5 m ≦<br>5 kg/cm$^2$ — 24 hr/5 m ≦ | X |
| 2 | SAME AS ABOVE | 60 | $2 \times 10^3$ | SAME AS ABOVE | SAME AS ABOVE | X |
| 3 | 20 | 15 | $1 \times 10^6$ | 7 | 1.5 kg/cm$^2$ — 15 hr/0.5 m<br>5 kg/cm$^2$ — 10 hr/5 m | X |
| 4 | SAME AS ABOVE | 60 | $2 \times 10^3$ | SAME AS ABOVE | 1.5 kg/cm$^2$ — 24 hr/0.5 m ≦<br>5 kg/cm$^2$ — 24 hr/5 m ≦ | O |
| 5 | 30 | 15 | $1 \times 10^6$ | MORE THAN 10 | 1.5 kg/cm$^2$ — 5 h/0.5 m<br>5 kg/cm$^2$ — 1 hr/5 m | X |
| 6 | SAME AS ABOVE | 50 | $1 \times 10^4$ | SAME AS ABOVE | 1.5 kg/cm$^2$ — 24 hr/0.5 m ≦<br>5 kg/cm$^2$ — 24 hr/5 m ≦ | O |
| 7 | SAME AS ABOVE | 60 | $2 \times 10^3$ | SAME AS ABOVE | SAME AS ABOVE | O |
| 8 | SAME AS ABOVE | 70 | $1 \times 10^3$ | 7 | 1.5 kg/cm$^2$ — 5 h/0.5 m<br>5 kg/cm$^2$ — 1 hr/5 m | X |

In this Table, the cables 4, 6 and 7 having the features of the present invention provide the satisfactory results as indicated by the symbol "O", since these cables have volume resistivities of $2 \times 10^3$ Ω-cm and $1 \times 10^4$ Ω-cm which meet the first requirement of "less than $1 \times 10^6$ Ω-cm", continuous extruding operation of 7 days and 10 days which meet the second requirement of "7 days", and water-tight performances of more than 24 hours/0.5 m at a hydraulic pressure of 1.5 kg/cm$^2$ and more than 24 hours/5 m at a hydraulic pressure of 5 kg/cm$^2$ which meet the third requirement of "24 hour/0.5 m at a hydraulic pressure of 0.5 kg/cm$^2$" and "24 hour/5 m at a hydraulic pressure of 5 kg/cm$^2$". The remaining cables 1 to 3, 5 and 8 having no features of the present invention do not meet at least one of the first to third requirements. Thus, it is decided that these cables an inner semi-conductive layer which is extruded on said conductor;
a rubber or plastic insulation layer which is extruded on said inner semiconductive layer; and
an outer semi-conductive layer which is extruded on said rubber or plastic insulation layer.

2. A water-tight rubber or plastic insulated cable, comprising:
   a conductor consisting of stranded wires, said conductor being compressed to have a solidity factor of 85 to 95% of said conductor;
   water-tight compound, injected with apertures among said stranded wires and not provided on an outermost surface of said conductor, which comprises conductive carbon of 50 to 60 weight %;

an inner semiconductive layer which is extruded on said conductor;

a rubber or plastic insulation layer which is extruded on said inner semiconductive layer; and an outer semiconductive layer which is extruded on said rubber or plastic insulation layer.

3. A water-tight rubber or plastic insulated cable, comprising:

a conductor consisting of stranded wires, said conductor being compressed to have a solidity factor of 85 to 95% of said conductor;

a water-tight compound, injected into apertures among said stranded wires and not provided on an outermost surface of said conductor, which has a scorch time of more than 20 minutes under a temperature of 130° C. and comprises conductive carbon of 50 to 60 weight %;

an inner semiconductive layer which is extruded on said conductor;

a rubber or plastic insulation layer which is extruded on said inner semiconductive layer; and an outer semiconductive layer which is extruded on said rubber or plastic insulation layer.

* * * * *